United States Patent [19]

Takahashi et al.

[11] Patent Number: 4,980,250

[45] Date of Patent: Dec. 25, 1990

[54] SECONDARY BATTERY

[75] Inventors: Yuzuru Takahashi; Yoshio Kawai; Naoto Sakurai, all of Niigata, Japan

[73] Assignee: Mitsubishi Gas Chemical Company, Inc., Tokyo, Japan

[21] Appl. No.: 46,153

[22] Filed: May 5, 1987

[30] Foreign Application Priority Data

May 13, 1986 [JP] Japan ................................ 61-107759
Oct. 20, 1986 [JP] Japan ................................ 61-247397

[51] Int. Cl.$^5$ ............................................ H01M 10/40
[52] U.S. Cl. .................................... 429/194; 429/217; 429/218
[58] Field of Search ........................................ 429/194

[56] References Cited

U.S. PATENT DOCUMENTS

| | | | |
|---|---|---|---|
| 4,271,242 | 6/1981 | Toyoguchi et al. | 429/194 |
| 4,497,883 | 2/1985 | Murray | 429/194 |
| 4,510,216 | 4/1985 | Nogami et al. | 429/194 |
| 4,615,959 | 10/1986 | Hayashi et al. | 429/194 |
| 4,617,243 | 10/1986 | Nogami et al. | 429/194 |

OTHER PUBLICATIONS

Chemical Abstracts, vol. 103, No. 18, Nov. 4, 1985, p. 172.

Primary Examiner—Donald L. Walton

[57] ABSTRACT

A secondary battery comprising a rechargeable positive electrode, a rechargeable lithium-containing negative electrode, a separator allowing the positive electrode and negative electrode to be separated from each other, and organic electrolyte solution for connecting the positive electrode and negative electrode. The negative electrode includes a complex having a carbon molded article made of carbon fiber or carbon powder having an interfacial distance ($d_{002}$) of 3.38 to 3.56 Å as measured by X-ray diffraction analysis using silicon as standard material, wherein lithium have been absorbed into the carbon molded article beforehand. The above value of interfacial distance corresponds to 3.36 to 3.48 Å as measured by X-ray diffraction analysis using no standard material.

13 Claims, 2 Drawing Sheets

FIG. 1

SECONDARY BATTERY

BACKGROUND OF THE INVENTION

1. Field of the Invention

This invention relates to a non-aqueous electrolytic secondary battery and more particularly to a negative electrode for secondary battery which shows a high energy density and a long charge-discharge cycle life.

2. Description of the Related Art

Generally, the battery using lithium as negative electrode active material offers the advantages of a high energy density, being light and compact, and a long-term storage life. Therefore, various primary batteries of this type have been put to practical use. However, if the negative electrode active material of this type is used for secondary batteries, there would occur new problems which do not exist in the primary batteries. Namely, the secondary batteries using lithium as negative electrode have the disadvantages of a short charge-discharge cycle life and a low charge-discharge efficiency. These problems are caused by the fact that the deposited lithium on the negative electrode is not plate-shaped but dendritic so that the lithium negative electrode is deteriorated.

There has been suggested using lithium alloys as negative electrode to solve the disadvantages caused by using lithium. The well-known example of the lithium alloys is lithium-aluminium alloy (see, for example, Japanese Patent Laid-open (Kokai) Publication No. 148277/1984). The lithium-aluminium alloy is uniform and thus it is usable as the negative electrode. However, it looses the uniformity in a short time under the charge-discharge cycle and does not offer a sufficient recycle life. Another development of the secondary lithium battery is to use fusible alloys consisting of a combination of heavy metals such as Bi, Pb, Sn and Cd. The lithium is absorbed into the fusible alloys so that the dendritic deposition of lithium is suppressed (see, for example, Japanese Patent Laid-open (Kokai) Publication No. 167280/1985). The secondary lithium battery of this type shows a prolonged life but sacrifices a high energy density which is one of the most superior property of the lithium battery.

Furthermore, it has been actually tried that a carbonaceous material is used for the electrode for the secondary lithium battery. For example, it has been proposed that a carbonaceous material such as graphite is used for the negative electrode. This attempt, however, does not offer a sufficient battery voltage and provides no practical result as yet.

Furthermore, it is known that a burning product of organic materials is brought into contact with metal lithium in the battery to form the negative electrode so as to eliminate the disadvantage caused by the use of the metal lithium as the negative electrode (see, for example, Japanese Patent Laid-open (Kokai) Publication No. 235372/1985). The secondary battery of this type, however, has the following disadvantages: in the case of a complicated shape of the negative electrode, the lithium must be worked to fit that shape, resulting in complicated manufacturing of battery and a limited shape of the battery.

In addition, it has been found, according to the inventors' experimental results, that some type of burning products of organic materials causes various problems, such that the pressure in the battery abnormally rises after the battery manufacturing so that the battery is in danger of a burst, that the battery voltage becomes too low, and that the metal lithium may be incompletely consumed so that the dendritic deposition occurs.

SUMMARY OF THE INVENTION

It is a primary object of the present invention to provide a rechargeable, long-life negative electrode for a secondary battery which solves the above-described problems caused by the conventional secondary battery using lithium as the negative electrode ensures no dendritic deposition, high energy density, long charge-discharge cycle life, light weight and high reliability.

The inventors have made an investigation to solve the problems caused by the use of lithium as the negative electrode, and developed a unique secondary battery in which the negative electrode for the secondary battery comprises a complex including a carbon molded article made of carbon fiber or carbon powder having a certain interfacial distance ($d_{002}$), where lithium have been absorbed into the carbon molded article beforehand. The secondary battery having the negative electrode of this type offers superior properties of high energy density, no dendritic deposition, long charge-discharge cycle life, high reliability and light weight.

Namely, the present invention comprises a rechargeable lithium-containing negative electrode, a rechargeable positive electrode, a separator and organic electrolyte solution, characterized in that the lithium-containing negative electrode includes a complex having a carbon molded article into which lithium has been absorbed, the carbon molded article being made of carbon fiber or carbon powder (simply referred to as carbon molded article hereafter) having a certain interfacial distance ($d_{002}$) within a range of 3.38 to 3.56 Å as measured by X-ray diffraction analysis using silicon as standard material. In this case, more preferable range of the interfacial distance is 3.40 to 3.52 Å.

If the interfacial distance ($d_{002}$) of the carbon fiber or carbon powder is greater than 3.56 Å, the battery voltage becomes too low and further rapidly drops simultaneously with the discharge starting. On the other hand, if the interfacial distance ($d_{002}$) of the carbon fiber or carbon powder is smaller than 3.38 Å, the battery voltage becomes too low as in the case of using carbonaceous material such as activated carbon and further the carbon molded article extremely swells when lithium is absorbed, so that the carbon molded article can not maintain its initial shape. Thus, the carbon molded article having either the greater or smaller interfacial distance than the above value is not practical for the negative electrode.

In the present invention, the interfacial distance of 3.38 to 3.56 Å is measured by X-ray diffraction analysis in which the X-ray is CuKα-ray and high-purity silicon is used as a standard material. Details of this analysis are disclosed in, for example, S. Ohtani "Carbon Fiber", Kindai-Henshusha, March 1986, Pages 733–742.

In fact, it should be noted that the above value of interfacial distance, 3.38 to 3.56 Å, corresponds to 3.36 to 3.48 Å as measured by the inventors' X-ray diffraction analysis using no standard material. More preferable value for this analysis using no standard material is 3.38 to 3.45 Å.

Further, it should be noted that the interfacial distance of carbon fiber and carbon powder as a raw material for the carbon molded article remains unchanged even after the carbon molded article is manufactured. Therefore, the respective interfacial distance of carbon fiber and carbon powder used in the carbon molded article can be obtained by using the above-noted process to measure the interfacial distance of a powder obtained by grinding the carbon molded article.

The carbon fiber for forming the carbon molded article is not limited in its raw material or its producing method. Typical examples of practical raw material are pitch, polyacrylonitrile, polyvinylchloride and phenol resin, and among them, the pitch is most preferable. The fiber diameter of the carbon fiber is not limited, either, but should be practically within a range of 0.01 to 100 $\mu$m and more preferably 0.1 to 50 $\mu$m.

The carbon fiber molded article in the invention is made from carbon fiber with or without binder so as to be formed into the form of plate, net, woven fabric, nonwoven fabric or paper, although the form is not limited to the above.

Typical examples of the commercially available carbon fiber molded article are "KUREKA PAPER" made by KUREHA KAGAKU KABUSHIKI KAISHA and one made by NIPPON CARBON KABUSHIKI KAISHA.

These carbon fiber molded articles are shaped into desired shapes for use as a negative electrode such as circle, ellipse or square.

Furthermore, the carbon molded article may be treated, prior to use, by physical treatments such as heating and washing and chemical treatments using acid or alkali as required, to improve its properties.

In particular, high temperature heating treatment is preferable: for example, usually not less than 500° C. in an inert gas atmosphere and more preferably about 1000° to 3000° C. The carbon molded article may be a laminated product.

For the carbon powder molded article, the mean particle size of the carbon powder is generally 0.1 to 30 $\mu$m, preferably 0.5 to 20 $\mu$m.

In the invention, the mean particle size is determined by using the liquid sedimentation method with the Stokes' sedimentation equation, in which a particle distribution is measured by the light transmission method, and the particle size at which the accumulative distribution reaches 50% is defined as the mean particle size. This measurement is performed, for example, by using a "centrifugal auto particle analyzer" made by HORIBA SEISAKUSHO KABUSHIKI KAISHA.

The carbon powder used for the invention can be obtained by grinding carbon fiber, carbon block or artificial graphite having the above-mentioned interfacial distance into powder and classifying it.

The carbon powder molded article used for the invention is formed, usually with binder, into the form of, for example, a plate or sheet, and shaped into desired shapes such as circle, ellipse or square. But the shape is not limited to the above.

The binder may be any one so long as it is inactive chemically and electrochemically: for example, polyethylene, polypropylene and teflon (trademark) are preferable.

The amount of the binder is not more than 50 wt. % of carbon molded article: for the carbon fiber molded article, preferably 2 to 50 wt. % and more preferably 5 to 30 wt. %; for the carbon powder molded article, preferably 1 to 20 wt. % and more preferably 2 to 10 wt. %.

The specific electric resistance of the carbon molded article is not more than $10^6 \Omega$. cm and preferably $10^{-4}$ to $10^4 \Omega$. cm.

The thickness of the carbon molded article is dependent upon the required battery capacity and area, and in practice, it should be usually within a range of 0.05 to 50 mm and preferably 0.1 to 20 mm. The bulk density of the carbon molded article is preferably 1 to 2 g/cm$^3$.

The negative electrode for the invention is a complex including the above-mentioned carbon molded article into which lithium has been absorbed beforehand.

If the carbon molded article per se is used as the negative electrode, an energy density will become low and a charge-discharge cycle life will be short.

The method of allowing lithium to be absorbed into the carbon molded article is not limited, but an electrochemical method or a physical method is usually used. For example, for the electrochemical method, the following steps are performed: the complex of carbon molded article into which lithium is to be absorbed is connected with plus terminal of an external DC power source, while metal lithium is connected with minus terminal of the external DC power source; lithium salt such as LiCl, LiPF$_6$, LiClO$_4$, LiBF$_4$, LiAsF$_6$ or LiSbF$_6$ is dissolved into organic solvent such as propylene carbonate, acetonitril, $\gamma$-butyrolactone, dimethoxyethane, tetrahydrofurane or N,N-dimethylformamide to provide electrolyte solution; and an electric current is allowed to flow between the positive electrode and negative electrode in the electrolyte solution. Instead thereof, these electrodes may be short-circuited through a conductor.

For the physical method, the carbon molded article is brought into contact with metal lithium in the above-mentioned electrolyte solution containing lithium salt. For example, the carbon molded article is brought into contact with two metal lithium plates therebetween or brought into contact with one metal lithium plate to form a laminated product, then the laminated product is immersed in the electrolyte solution.

The amount of absorbed lithium into the carbon molded article varies depending upon the kind of the carbon molded article, but may be within a range of 0.1 to 65 g per 100 g carbon molded article and preferably 0.5 to 10 g per 100 g carbon molded article.

It is preferable that the lithium absorption is performed under less moisture and less oxygen atmosphere: more preferably under substantially no moisture atmosphere and most preferably under substantially no oxygen and no moisture atmosphere.

The positive electrode used for the invention may be any one so long as it is rechargeable: for example, chalcogenides of transition metals, conjugated polymers or activated carbon. But the positive electrode is not limited to these examples.

Examples of the calcogenides of transition metals are oxides such as TiO$_2$, Cr$_3$O$_5$, V$_2$O$_5$, V$_3$O$_6$, MnO$_2$, CuO or MoO$_2$, sulfides such as TiS$_2$, VS$_2$, FeS or MoS$_2$ and selenium compounds such as NbSe$_3$.

Examples of the conjugated polymers are polyacetylene, polyparaphenylene, polyparaphenylenesulfide, polypyrole, polythiophene and polyaniline.

The positive electrode of this type is made to form a film-like or plate-like molded article. The positive electrode molded article can be obtained by the method, wherein powder for the positive electrodes is pressed in a metal mold, with conductive materials such as graphite or acetylene black powder and binding agent such as polyethylene powder, polypropylene powder or teflon powder being added as required. Instead thereof, these powders may be rolled. But the producing method for the positive electrode is not limited to the above.

The lithium salt used for the electrolyte solution of secondary battery may be any one: typical examples are LiCl, LiClO$_4$, LiBF$_4$, LiPF$_6$, LiAsF$_6$ and LiSbF$_6$. Of these salts, LiClO$_4$ and LiPF$_6$ are preferable. Usually, one kind of the lithium salts is used, but two or more kinds may be used in mixture.

The lithium salt is dissolved into the solvent to provide the electrolyte solution of secondary battery. The solvent may be any one so long as the lithium salts can be dissolved thereinto, and it is preferable to use nonprotic, high-dielectric organic solvent such as nitrile, carbonate, ether, nitro compound, amide, sulfur-containing compound, chlorinated hydrocarbon, ketone or ester. Typical examples of these organic solvents are acetonitrile, propyonitrile, propylene carbonate, ethylene carbonate, tetrahydrofurane, 1,4-dioxane, dimethoxyethane, nitromethane, N,N-dimethylformanide, dimethylsulfoxide, sulfolane and γ-butyrolactone. A single kind or two or more kinds in mixture of these organic solvents may be used.

The concentration of the lithium salt in the solution is usually 0.1 to 5 mol/l and preferably 0.5 to 1.5 mol/l.

The above-mentioned electrolyte solution containing lithium salt is usually impregnated into a separator, and ionically connect between positive electrode and negative electrode.

The separator may be nonwoven or woven fabric made of synthetic resin, nonwoven or woven fabric made of glass fiber, or nonwoven or woven fabric made of natural fiber. The synthetic resin may be polyethylene, polypropylene or polytetrafluoroethylene. The thickness of the separator is not limited to a certain value so long as the separator can contain a required amount of the elctrolyte solution and its thickness can prevent short circuit between the positive electrode and negative electrode. The thickness is usually within a range of 0.05 to 10 mm and preferably 0.1 to 2 mm.

The secondary battery in the present invention may preferably include a current collector as in the conventional battery. The conventional current collector is usable also in the present invention, in such a manner that an electrochemically inactive conductor is used for the electrolyte solution and the positive electrode and negative electrode, respectively. For example, metals such as nickel, titanium or stainless steel are usable with the shape such as plate, foil or net. The positive electrode current collector and the negative electrode current collector may be made of different materials or the same material. The thickness of the current collector should be within a range of 0.001 to 10 mm and preferably 0.01 to 5 mm.

The positive electrode and negative electrode are respectively housed in a positive electrode casing and a negative electrode casing made of metal such as stainless steel.

DETAILED DESCRIPTION OF THE PREFERRED EMBODIMENTS

Figure 1:
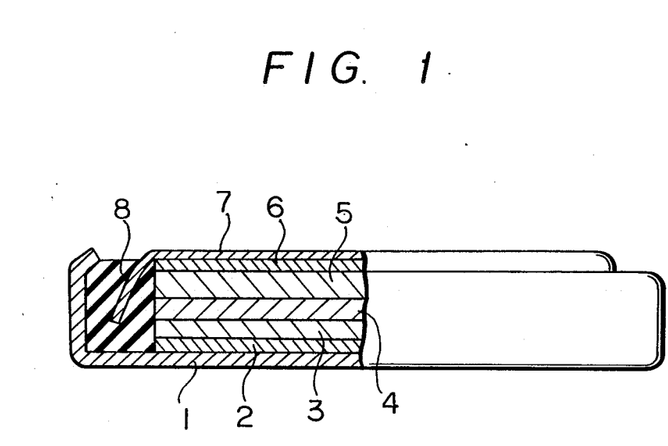
FIG. 1 is a cross-sectional view showing a coin-shaped secondary battery according to an embodiment of the present invention.

One example of the secondary battery according to the present invention will be described with referring to FIG. 1 showing a partially broken-away cross-sectional view. On the bottom of a negative electrode casing 1 is disposed a negative electrode current collector 2 on which a negative electrode 23 is fixed by press. On the negative electrode 3 is set a separator 4 which has been impregnated with electrolyte solution. On the separator 4 are piled a positive electrode 5, a positive electrode current collector 6 and a positive electrode casing 7 in the described order. A peripheral gap between the negative casing 1 and the positive electrode casing 7 is filled with a gasket 8.

The present invention will be described in more detail by referring to the below examples, but the present invention is not limited to these examples. It should be noted that, in the examples, the interfacial distance value without or outside of parentheses indicates the value as measured with the use of silicon as standard material, while one in parentheses indicates the value as measured without use of standard material.

EXAMPLE 1

A carbon fiber molded article made by KUREHA KAGAKU KABUSHIKI KAISHA (trademark: Carbon Material for Fuel Cell KEF-1200, diameter 16 mm, thickness 2.5 mm, weight 251 mg) having an interfacial distance ($d_{002}$) of 3.42 Å (3.408 Å) was fixed to a stainless steel net. A metal lithium sheet (diameter 20 mm, thickness 1.5 mm) was also fixed by press to a stainless steel net. A glass vessel contained propylene carbonate solution in which lithium perchlorate has been dissolved with a concentration of 1 mol/l. Both of the carbon fiber molded article and the metal lithium sheet with the respective stainless steel nets were immersed in the solution in the glass vessel. The glass vessel was placed in a dry box which is filled with an argon gas.

Next, the plus terminal of an external DC power source was connected with the stainless steel net of the metal lithium sheet, while the minus terminal of the power source was connected with the stainless steel net of the carbon fiber product. This circuit was energized with a constant current of 0.5 mA for 40 hours, so that there was obtained a complex of carbon fiber molded article into which 5.2 mg metal lithium had been absorbed.

The thus obtained complex of carbon fiber molded article was used as a negative electrode, while the below-mentioned disk shaped molded article was used as a positive electrode. The disk shaped molded article (weight 90 mg, diameter 15 mm) was made of a mixture of 80 weight part of vanadium pentoxide, 10 weight part of acetylene black as conductive material and 10 weight part of teflon powder as binding agent. Polypropylene nonwoven fabric was impregnated with propylene solution into which lithium perchlorate had been dissolved with a concentration of 1 mol/l, to obtain a separator. By assembling the above elements, a coin-shaped secondary battery was produced.

Figure 2:
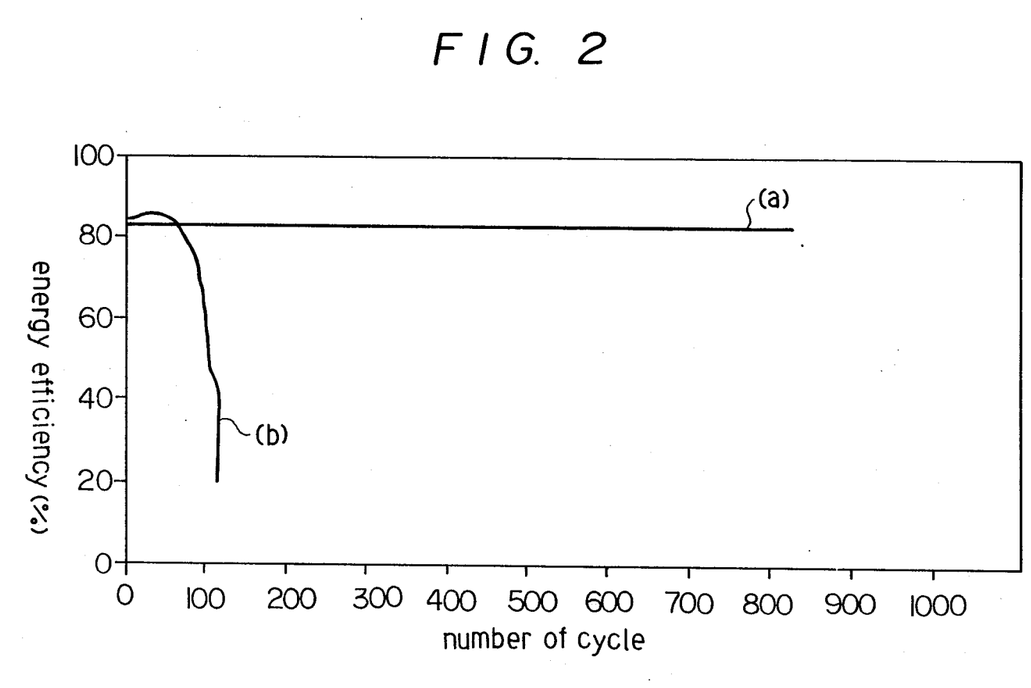
FIG. 2 is a graph showing a charge-discharge cycle.

The thus produced secondary battery showed an initial open-circuit voltage of 3.38 V. When the discharge was performed with a constant current of 4 mA until the discharge voltage came down to 2.0 V, a discharge capacity of 9.5 mAh was obtained. Thereafter, the charge-discharge cycle test was performed with a constant current of 4 mA for each 1-hour cycle term. As a result, a good energy efficiency was obtained as shown by a straight line (a) in FIG. 2, which indicates a good charge-discharge cycle characteristic of high reversibility. Note that the energy efficiency is defined by the following formula: energy efficiency (%)=(discharge capacity×mean discharge voltage) /(charge capacity×mean charge voltage).

COMPARATIVE EXAMPLE 1

Instead of the carbon fiber molded article, a metal lithium disk (diameter 15 mm, thickness 0.5 mm) was used as the negative electrode. Other conditions were similar to those in Example 1 to produce a secondary battery.

The thus obtained secondary battery showed in initial open-circuit voltage of 3.41 V. When the discharge was performed with a constant current of 4 mA until the discharge voltage came down to 2.0 V, a discharge capacity of 10.4 mAh was obtained. Thereafter, the charge-discharge cycle test was performed with a constant current of 4 mA and an 1-hour cycle term. As a result, a poor energy efficiency was obtained as shown by a curve (b) in FIG. 2.

EXAMPLE 2

Four carbon fiber molded articles made by KUREHA KAGAKU KABUSHIKI KAISHA (trademark: KUREKA Paper E-715, diameter 16 mm, thickness 0.4 mm, weight 25.1 mg) each having an interfacial distance ($d_{002}$) of 3.42 Å (3.398 Å) were laminated to each other. Two metal lithium disks (diameter 18 mm, thickness 1.5 mm) were fixed by press, respectively, to the opposite sides of the laminated product. The carbon fiber molded articles were impregnated with propylene carbonate solution into which lithium haxafuluorophosphate had been dissolved with a concentration of 1 mol/l. The thus treated carbon fiber products were left as they were for 48 hours to obtain carbon fiber products with 5.2 mg absorbed lithium.

The thus obtained complex of carbon fiber molded articles was used as the negative electrode to produce a secondary battery in the same manner as in Example 1.

The thus produced secondary battery showed an initial open-circuit voltage of 3.40 V. When the discharge was performed with a constant current of 1 mA until the discharge voltage came down to 2.0 V, a discharge capacity of 10.2 mAh was obtained. Thereafter, the charge-discharge cycle test was performed with a constant current of 1 mA and a 4-hour cycle term. As a result, an energy efficiency was 88.1% at a 50th cycle and 87.5% at a 800th cycle.

EXAMPLE 3

A carbon fiber molded article made by NIPPON CARBON KABUSHIKI KAISHA (trademark: GF-8, diameter 18 mm, thickness 3 mm, weight 139.0 mg) having an interfacial distance ($d_{002}$) of 3.54 Å (3.418 Å) was used and treated in the same manner as in Example 2, to obtain carbon fiber molded article with 85.4 mg lithium absorbed.

The thus obtained complex of carbon fiber molded article was used as the negative electrode to produce a secondary battery in the same manner as in Example 1.

The thus produced secondary battery showed an initial open-circuit voltage of 3.36 V. When the discharge was performed with a constant current of 5 mA until the discharge voltage came down to 2.0 V, a discharge capacity of 6.6 mAh was obtained.

COMPARATIVE EXAMPLE 2

One graphite sheet made by TOYO TANSO KABUSHIKI KAISHA (trademark: PF-20, diameter 16 mm, thickness 0.25 mm) having an interfacial distance ($d_{002}$) of 3.35 Å (3.345Å) was used and treated with lithium absorption in the same manner as in Example 2. The following problems were found in this Comparative Example 2: the graphite sheet became swelled and, upon peeling off the graphite sheet from the lithium surface, the graphite simultaneously crumbled at its center and lost the initial shape. The amount of the absorbed lithium was 6.5 mg.

Next, the thus crumbled graphite sheet was used as the negative electrode to produce a secondary battery in the same manner as in Example 1. As a result, the initial open-circuit voltage of the battery showed only 1.32 V and the charge-discharge cycle test could not be performed.

COMPARATIVE EXAMPLE 3

An activated carbon fiber molded article made by TOYO BOSEKI KABUSHIKI KAISHA (trademark: KF Felt KF-1600, diameter 18 mm, thickness 3.0 mm) having an interfacial distance ($d_{002}$) of 3.65 Å (3.489 Å) was used and treated with lithium absorption in the same manner as in Example 2. As a result, there was obtained a complex of activated carbon fiber molded article with 395.9 mg lithium absorbed.

The thus obtained complex of activated carbon fiber molded article was used as the negative electrode to produce a secondary battery in the same manner as in Example 1.

The thus produced secondary battery showed an initial open-circuit voltage of 2.48 V. When the discharge was performed with a constant current of 1 mA, the discharge voltage rapidly dropped so that the charge-discharge cycle test could not be performed.

EXAMPLE 4

The complex of carbon fiber molded article with lithium absorbed thereinto obtained in the same manner as in Example 1 was used as the negative electrode, while the below-mentioned disk produce was used as the positive electrode. The disk product (weight 100 mg, diameter 15 mm) was made of a mixture of 80 weight part of titanium disulfide, 10 weight part of acetylene black as conductive material and 10 weight part of teflon powder as binding agent. Polypropylene nonwoven fabric was impregnated with propylene carbonate solution into which lithium hexafuluorophosphate had been dissolved with a concentration of 1 mol/l, to obtain a separator. By assembling the above elements, a coin-shaped secondary battery was produce.

The thus produced secondary battery showed an initial open-circuit voltage of 2.69 V. When the charge-discharge cycle test was performed with a constant current of 2 mA for each 2-hour cycle term, a good charge-discharge cycle characteristic of high reversibility was obtained: the energy efficiency was 86.4% at a first cycle and 82.6% at a 200th cycle.

EXAMPLE 5

The complex of carbon fiber molded article with lithium absorbed thereinto obtained in the same manner as in Example 1 was used as the negative electrode, while an activated carbon fiber molded article made by TOYO BOSEKI KABUSHIKI KAISHA (trademark: KF Felt KF-1600, diameter 15 mm, thickness 3.0 mm, weight 32.6 mg) was used as the positive electrode. Other conditions were similar to those in Example 1 to produce a coin-shaped secondary battery.

The thus produced secondary battery showed an initial open-circuit voltage of 3.34 V. When the charge-discharge cycle test was performed with a constant current of 1 mA for each 1-hour cycle term, a good charge-discharge cycle characteristic of high reversibility was obtained: the energy efficiency was 89.6% at a first cycle and 87.5% at a 600th cycle.

EXAMPLE 6

Three carbon fiber molded articles made by KUREHA KAGAKU KABUSHIKI KAISHA (trademark: KUREKA Paper E-704, diameter 14 mm, thickness 0.3 mm, weight 6.6 mg) each having an interfacial distance ($d_{002}$) of 3.49 Å (3.442 Å) were laminated to each other. Two metal lithium disks (diameter 16 mm, thickness 1.5 mm) were fixed by press, respectively, to the opposite sides of the laminated molded article. The carbon fiber molded articles were impregnated with propylene carbonate solution into which lithium hexafuluorophosphate had been dissolved with a concentration of 1 mol/l. The thus treated carbon fiber molded articles were left as they were for 48 hours to obtain a complex of carbon fiber molded articles with 1.0 mg lithium absorbed thereinto.

The thus obtained complex of carbon fiber molded articles was used as the negative electrode, while three sheets of woven fabric made of activated carbon fiber molded article made by TOYO BOSEKI KABUSHIKI KAISHA (trademark: KF Cloth BNF-1500-50, diameter 14 mm, thickness 0.2 mm, weight 8.2 mg) were laminated to each other and used as the positive electrode. Polypropylene nonwoven fabric was impregnated with mixture solution of propylene carbonate and dimethoxyethane (volume ratio 1:1) into which lithium hexafuluorophosphate had been dissolved with a concentration of 1 mol/l, to obtain a separator. By assembling the above elements, a coin-shaped secondary battery was produced.

The thus produced secondary battery showed an initial open-circuit voltage of 3.31 V. When the discharge was performed with a constant current of 1 mA until the discharge voltage came down to 1.8 V, a discharge capacity of 0.98 mAh was obtained within a discharge voltage range of 3 to 2 V. Thereafter, the charge-discharge cycle test was performed with a constant current of 5 mA within a range of an upper-limit cut-off voltage of 3 V to a lower-limit cutoff voltage of 2 V. As a result, a good charge-discharge cycle characteristic of high reversibility was obtained: at a first cycle, the discharge capacity was 0.47 mAh and the coulombic efficiency was 98.5%; and at a 5,000th cycle, the discharge capacity was 0.45 mAh and the coulombic efficiency was 98.0%.

EXAMPLE 7

A carbon fiber molded article made by KUREHA KAGAKU KABUSHIKI KAISHA (trademark KUREKA Paper E-715) having an interfacial distance ($d_{002}$) of 3.42 Å (3.40 Å) was grinded into carbon powder. The mean particle size of the carbon powder was measured by an auto-particle analyzer made by HORIBA SEISAKUSHO KABUSHIKI KAISHA (trademark CAPA-500). The measured value was 3.5 μm. (Note that the mean particle size for the following examples and comparative examples were also measured by the same analyzer.) The carbon powder of 90 weight part was mixed and kneaded with teflon powder of 10 weight part, and thereafter pressed to form a carbon powder product having a weight of 50 mg, a diameter of 15 mm, a thickness of 0.23 mm and a bulk density of 1.23 g/cc.

The obtained carbon powder molded article was disposed in opposition to a metal lithium disk (diameter 18 mm, thickness 1.5 mm) with glass fiber nonwoven fabric interposed therebetween. The resultant assembly was held between two stainless steel plates and pressed. This assembly was impregnated with mixture solution of propylene carbonate and dimethoxyethane (volume ratio 1:1) into which lithium hexafuluorophosphate had been dissolved with a concentration of 1 mol/l. The two stainless steel plates were connected through a metal clip to each other so that the carbon powder product was electrically short-circuited between the two metal lithium disks through the stainless steel plates and the clip. This assembly was left as it was in a dry box filled with argon gas for 120 hours, so that there was obtained a complex of carbon molded article with lithium absorbed, which corresponds to 3.0 mg metal lithium.

The thus obtained complex was used as the negative electrode, while the below-mentioned disk product was used as the positive electrode. The disk product (weight 200 mg, diameter 15 mm) was made of a mixture of 80 weight part of vanadium pentoxide, 10 weight part of acetylene black as conductive material and 10 weight part of teflon powder as binding agent. Polypropylene nonwoven fabric was impregnated with mixture solution of propylene carbonate and dimethoxyethane (volume ratio 1:1) into which lithium hexafuluorophosphate had been dissolved with a concentration of 1 mol/l, to obtain a separator. By assembling the above elements, a coin-shaped secondary battery was produced.

The thus produced secondary battery showed an initial open-circuit voltage of 3.38 V. When the discharge was performed with a constant current of 1 mA until the discharge voltage came down to 2.0 V, there was obtained a discharge capacity of 95.4 Ah/l of negative electrode.

COMPARATIVE EXAMPLE 4

Two carbon fiber molded articles made by KUREHA KAGAKU KABUSHIKI KAISHA (trademark: KUREKA Paper E-715, weight 25.0 mg, diameter 15 mm, thickness 0.4 mm, fiber diameter 18 μm, bulk density 0.35 g/cc) having an interfacial distance ($d_{002}$) of 3.42 Å (3.40 Å) were used. Other conditions were similar to those in Example 7, to obtain a complex of carbon molded article with lithium absorbed, which corresponds to 1.9 mg metal lithium.

The thus obtained complex was used as the negative electrode. Other conditions were similar to those in Example 7 to produce a secondary battery.

The thus produced secondary battery showed an initial open-circuit voltage of 3.40 V. When the discharge was performed with a constant current of 1 mA until the discharge voltage came down to 2.0 V, there was obtained a discharge capacity of only 37.9 Ah/l of the negative electrode.

COMPARATIVE EXAMPLE 5

A carbon block made by NIPPON CARBON KABUSHIKI KAISHA (trademark: EG-38) having an interfacial distance ($d_{002}$) of 3.36 Å (3.35 Å) was grinded into carbon powder having a mean particle size of 5.4 μm. The carbon powder was molded into a carbon powder molded article, in the same manner as in Example 7, having a weight of 50 mg, a diameter of 15 mm, a thickness of 0.17 mm and a bulk density of 1.79 g/cc.

The thus obtained carbon powder molded article was treated in the same manner as in Example 7 to try the lithium absorption. However the carbon powder molded article was too swelled and could not keep its shape. Thus, it was useless for the negative electrode.

EXAMPLE 8

A carbon block made by NIPPON CARBON KABUSHIKI KAISHA (trademark: SEG-RB) having an interfacial distance ($d_{002}$) of 3.41 Å (3.39 Å) was grinded into carbon powder having a mean particle size of 2.7 μm. The carbon powder of 90 weight part was mixed and kneaded with teflon powder of 10 weight part and thereafter pressed to form a carbon molded article having a weight of 50 mg, a diameter of 15 mm, a thickness of 0.18 mm and a bulk density of 1.57 g/cc.

The thus obtained carbon powder molded article and a metal lithium disk (diameter 18 mm, thickness 1.5 mm) were treated in the same manner as in Example 7, so that there was obtained a complex of carbon powder molded article with lithium absorbed, which corresponds to 4.8 mg metal lithium.

The thus obtained complex was used as the negative electrode. Other conditions were similar to those in Example 7 to produce a secondary battery.

The thus produced secondary battery showed an initial open-circuit voltage of 3.36 V. When the discharge was performed with a constant current of 1 mA until the discharge voltage came down to 2.0 V, there was obtained a discharge capacity of 144 Ah/l of negative electrode.

EXAMPLE 9

A carbon fiber molded article made by NIPPON CARBON KABUSHIKI KAISHA (trademark GF-8) having an interfacial distance ($d_{002}$) of 3.54 Å (3.42 Å) was grinded into carbon powder having a mean particle size of 22.0 μm. The carbon powder was treated and shaped, in the same manner as in Example 7, to form a carbon powder molded article having a weight of 50 mg, a diameter of 15 mm, a thickness of 0.2 mm and a bulk density of 1.40 g/cc.

The thus obtained carbon powder product was disposed in a opposition to a metal lithium disk (diameter 18 mm, thickness 1.5 mm) with glass fiber nonwoven fabric interposed therebetween. The resultant assembly was held between two stainless steel plates each having terminal and pressed. This assembly was impregnated with propylene carbonate solution into which lithium perchlorate had been dissolved with a concentration of 1 mol/l. Next, the positive terminal of an external DC power source was connected with the stainless steel plate on the metal lithium disk, while the negative terminal was connected with the stainless steel plate on the carbon powder product molded article, so that an electric circuit is formed. This circuit was energized with a constant current of 0.5 mA until the terminal voltage became 0.00 V, so that there was obtained a complex of carbon powder molded article with lithium absorbed, which corresponds to 7.1 mg metal lithium.

The thus obtained complex was used as the negative electrode. Except that lithium perchlorate ($LiClO_4$) was dissolved into the solution with a concentration of 1 mol/l, conditions were similar to those in Example 7 to produce a secondary battery.

The thus produced secondary battery showed an initial open-circuit voltage of 3.39 V. When the discharge was performed with a constant current of 1 mA until the discharge voltage came down to 2.0 V, there was obtained a discharge capacity of 121 Ah/l of negative electrode.

Thereafter, the charge-discharge cycle test was performed with a constant current of 1 mA within a range of an upper-limit cut-off voltage of 4.0 V to a lower-limit cut-off voltage of 2.0 V. As a result, there was obtained a good charge-discharge cycle characteristic of high reversibility: the current efficiency was 97.8% at a sixth cycle and 96.2% at a 150th cycle.

COMPARATIVE EXAMPLE 6

An activated carbon fiber molded article made by TOYO BOSEKI KABUSHIKI KAISHA (trademark: KF Cloth KF-1600) having an interfacial distance ($d_{002}$) of 3.65 Å (3.49 Å) was grinded into carbon powder and treated and shaped, in the same manner as in Example 7, to form a carbon powder molded article having a weight of 50 mg, a diameter of 15 mm, a thickness of 0.20 mm and a bulk density of 0.90 g/cc.

The thus obtained carbon powder molded article and a metal lithium disk (diameter 18 mm, thickness 1.5 mm) were used. Other conditions were similar to in Example 9 to obtain a complex of carbon molded article with lithium absorbed, which corresponds to 19.8 mg metal lithium.

The thus obtained complex was used as the negative electrode. Other conditions were similar to those in Example 9 to produce a secondary battery.

The thus produced secondary battery showed an initial open-circuit voltage of 2.40 V. When the discharge was performed with a constant current of 1 mA until the discharge voltage came down to 2.0 V. As a result, there was obtained a discharge capacity of only 2.0 Ah/l of negative electrode. Furthermore, the secondary battery was not rechargeable.

EXAMPLE 10

The complex obtained in the same manner as in Example 7 was used as the negative electrode, while a carbon fiber molded article made by TOYO BOSEKI KABUSHIKI KAISHA (trademark: KF Cloth KF-1600, diameter 15 mm, thickness 3.0 mm, weight 32.6 mg) was used as the positive electrode. Other conditions were similar to those in Example 7 to produce a coin-shaped secondary battery.

The thus produced secondary battery showed an initial open-circuit voltage of 3.20 V. When the charge-discharge cycle test was performed with a constant current of 1 mA within a range of a lower-limit cut-off voltage of 1.8 V to an upper-limit cut-off voltage of 3.2 V. As a result, there was obtained a good charge-discharge cycle characteristic of high reversibility: the current efficiencies at a 100th and a 550th cycles were 99.8%, respectively.

EXAMPLE 11

Except that a carbon powder molded article of 200 mg was used, conditions were similar to in Example 8 to obtain the complex. The complex was used as the negative electrode, while the below-mentioned disk product was used as the positive electrode. The disk product (weight 100 mg, diameter 15 mm) was made of a mixture of 80 weight part of titanium disulfide, 10 weight part of acetylene black as conductive material and 10 weight part of teflon powder as binding agent. Other conditions were similar to in Example 7 to produce a coin-shaped secondary battery.

The thus produced secondary battery showed an initial open-circuit voltage of 2.66 V. When the charge-discharge cycle test was performed with a constant current of 2 mA for each 2-hour cycle term, there was obtained a good charge-discharge cycle characteristic of high reversibility: the energy efficiency was 85.3% at a fifth cycle and 83.4% at a 150th cycle.

As can be seen from the above description, the present invention uses a complex including a carbon fiber molded article or carbon powder molded article having a certain interfacial distance, wherein lithium have been absorbed into the carbon molded article beforehand. As a result, the secondary battery using the complex as the negative electrode offers the advantages of a high volume efficiency, a good charge-discharge cycle characteristic of high reversibility, high reliability, a long life and a long term storage.

We claim:

1. A secondary battery comprising:
   a rechargeable positive electrode;
   a rechargeable lithium-containing negative electrode including a complex having a carbon molded article made of carbon fiber or carbon powder having an interfacial distance ($d_{002}$) of 3.38 to 3.56 Å as measured by X-ray diffraction analysis using silicon as standard material, wherein lithium is absorbed into said carbon molded article before said negative electrode is placed in the secondary battery;
   a separator for separating said positive electrode and negative electrode from each other; and
   organic electrolyte solution for connecting said positive electrode and negative electrode.

2. A secondary battery according to claim 1, wherein said carbon fiber has a diameter of 0.01 to 100 $\mu$m.

3. A secondary battery according to claim 1, wherein said carbon powder has a mean particle size of 0.1 to 30 $\mu$m.

4. A secondary battery according to claim 1, wherein said carbon molded article is a laminated product.

5. A secondary battery according to claim 1, wherein said carbon molded article contains binder of 50 weight % of the carbon molded article or less.

6. A secondary battery according to claim 5, wherein said carbon molded article made of carbon fiber contains binder of 2 to 50 weight %.

7. A secondary battery according to claim 5, wherein said carbon molded article made of carbon powder contains binder of 1 to 20 weight %.

8. A secondary battery according to claim 1, wherein said carbon molded article has a specific electric resistance of $10^6$ $\Omega$. cm or less.

9. A secondary battery according to claim 1, wherein said carbon molded article has a bulk density of 1 to 2 g/cm$^3$.

10. A secondary battery according to claim 1, wherein said carbon molded article includes absorbed lithium, the amount of which is 0.2 to 65 g per 100 g carbon molded article.

11. A secondary battery according to claim 1, wherein said organic electrolyte solution contains organic solvent into which lithium salt has been dissolved.

12. A secondary battery according to claim 11, wherein said lithium salt has a concentration of 0.1 to 5 mol/l.

13. A secondary battery according to claim 1, wherein said separator includes synthetic resin containing organic electrolyte solution.

* * * * *

UNITED STATES PATENT AND TRADEMARK OFFICE
CERTIFICATE OF CORRECTION

PATENT NO. : 4,980,250
DATED : December 25, 1990
INVENTOR(S) : Yuzuru Takahashi; Yoshio Kawai, Naoto Sakurai It is certified that error appears in the above-identified patent and that said Letters Patent is hereby corrected as shown below:

Corrections to the patent should be made to reflect the following:

Column 1, lines 43-44, delete "property" and insert --properties-- therefor;

Column 3, line 58, delete "teflon" and insert --TEFLON-- therefor;

line 67, delete "$\Omega$. cm" and insert --$\Omega \cdot$cm-- therefor;

line 68, delete "$\Omega$. cm" and insert --$\Omega \cdot$cm-- therefor;

Column 4, line 67, delete "teflon" and insert --TEFLON-- therefor;

Column 5, line 68, delete "referring" and insert --reference-- therefor;

UNITED STATES PATENT AND TRADEMARK OFFICE
CERTIFICATE OF CORRECTION

PATENT NO. : 4,980,250

DATED : December 25, 1990

INVENTOR(S) : Yuzuru Takahashi; Yoshio Kawai, Naoto Sakurai

It is certified that error appears in the above-identified patent and that said Letters Patent is hereby corrected as shown below:

Corrections to the patent should be made to reflect the following:

Column 6, line 4, delete "23" and insert --3-- therefor;

line 52, delete "teflon" and insert --TEFLON-- therefor;

Column 7, line 11, delete "in" and insert --an-- therefor;

line 17, delete "an" and insert --a-- therefor;

lines 31-32, delete "haxafuluorophosphate" and insert --hexafluorophosphate-- therefor;

Column 8, line 45, delete "teflon" and insert --TEFLON-- therefor;

UNITED STATES PATENT AND TRADEMARK OFFICE
CERTIFICATE OF CORRECTION

PATENT NO. : 4,980,250

DATED : December 25, 1990

INVENTOR(S) : Yuzuru Takahashi; Yoshio Kawai, Naoto Sakurai

It is certified that error appears in the above-identified patent and that said Letters Patent is hereby corrected as shown below:

Corrections to the patent should be made to reflect the following:

lines 47-48, delete "hexafuluorophosphate: and insert --hexafluorophosphate-- therefor;

Column 9, lines 19-20, delete "hexafuluorophosphate" and insert --hexafluorophosphate-- therefor;

lines 34-35, delete "hexafuluorophosphate: and insert --hexafluorophosphate-- therefor;

line 67, delete "teflon" and insert --TEFLON-- therefor;

Column 10, line 11, delete "hexafuluorophosphate: and insert --hexafluorophosphate-- therefor;

line 27, delete "teflon" and insert --TEFLON-- therefor;

UNITED STATES PATENT AND TRADEMARK OFFICE
CERTIFICATE OF CORRECTION

PATENT NO. : 4,980,250
DATED : December 25, 1990
INVENTOR(S) : Yuzuru Takahashi; Yoshio Kawai, Naoto Sakurai It is certified that error appears in the above-identified patent and that said Letters Patent is hereby corrected as shown below:

Corrections to the patent should be made to reflect the following:

line 31, delete "hexafuluorophosphate" and insert --hexafluorophosphate-- therefor;

Column 11, line 15, delete "teflon" and insert --TEFLON-- therefor;

Column 12, line 62, after "similar to" insert --those-- therefor;

UNITED STATES PATENT AND TRADEMARK OFFICE
CERTIFICATE OF CORRECTION

PATENT NO. : 4,980,250

DATED : December 25, 1990

INVENTOR(S) : Yuzuru Takahashi, et al

It is certified that error appears in the above-identified patent and that said Letters Patent is hereby corrected as shown below:

Column 13, line 1, delete "teflon" and insert --TEFLON-- therefor;

line 2, after "similar to" insert --those-- therefor;

Column 14, line 19, delete "$\Omega \cdot$ cm" and insert --$\Omega \cdot$cm-- therefor; and line 25, delete "0.2" and insert --0.1-- therefor.

Signed and Sealed this

Twenty-ninth Day of September, 1992

Attest:

DOUGLAS B. COMER

*Attesting Officer*     *Acting Commissioner of Patents and Trademarks*